(12) United States Patent
Burkett

(10) Patent No.: US 9,797,380 B2
(45) Date of Patent: Oct. 24, 2017

(54) SOLAR POWERED COMPRESSOR FAN DRIVEN TURBINE GRID SCALE ELECTRICITY GENERATION SYSTEM

(71) Applicant: Bob Burkett, Dallas, TX (US)

(72) Inventor: Bob Burkett, Dallas, TX (US)

(73) Assignee: Bob Burkett, Carrollton, TX (US)

( * ) Notice: Subject to any disclaimer, the term of this patent is extended or adjusted under 35 U.S.C. 154(b) by 0 days.

(21) Appl. No.: 14/662,010

(22) Filed: Mar. 18, 2015

(65) Prior Publication Data

US 2015/0300196 A1    Oct. 22, 2015

Related U.S. Application Data

(60) Provisional application No. 61/954,601, filed on Mar. 18, 2014.

(51) Int. Cl.
*F02C 6/00* (2006.01)
*H02K 7/18* (2006.01)
*F03D 9/00* (2016.01)

(52) U.S. Cl.
CPC .............. *F03D 9/007* (2013.01); *Y02E 10/72* (2013.01); *Y10S 415/916* (2013.01)

(58) Field of Classification Search
CPC ......... F03G 6/001; F03G 6/045; Y02E 10/725
USPC ............................................... 290/44, 52, 55
See application file for complete search history.

(56) References Cited

U.S. PATENT DOCUMENTS

| | | | | |
|---|---|---|---|---|
| 4,159,426 A | * | 6/1979 | Staton | H02K 53/00 290/44 |
| 4,206,608 A | * | 6/1980 | Bell | F03D 9/007 290/4 R |
| 4,229,661 A | * | 10/1980 | Mead | F03D 9/028 290/44 |
| 4,684,813 A | * | 8/1987 | Watson | H02P 9/00 290/4 A |
| 4,735,552 A | * | 4/1988 | Watson | F03D 1/0608 416/142 |
| 8,368,240 B1 | * | 2/2013 | Burkett | F03D 9/00 290/44 |

* cited by examiner

*Primary Examiner* — Tulsidas C Patel
*Assistant Examiner* — Thomas Quigley

(57) ABSTRACT

Systems and methods for generating electricity using solar panels to power compressor fans that force air into a nacelle that turns a spiral turbine. The turbine is connected to a gearing system that is connected to a generator. The generator is connected to a master control unit and a transformer. The master control unit decides whether to store the electricity in batteries, power the compressor fans or send the surplus electricity to the grid. The horizontal or vertical embodiments of the invention do not require a tower or the long blades connected to a hub.

8 Claims, 6 Drawing Sheets

SOLAR POWERED COMPRESSOR FAN DRIVEN TURBINE GRID SCALE ELECTRICITY GENERATION SYSTEM

CROSS-REFERENCE TO RELATED APPLICATIONS

This application claims the benefit of the filing of U.S. Provisional Patent Application No. 61/954,601 filed on Mar. 18, 2014.

STATEMENT REGARDING FEDERALLY SPONSORED RESEARCH OR DEVELOPMENT

Not Applicable

REFERENCE TO SEQUENCE LISTING, A TABLE, OR A COMPUTER PROGRAM LISTING COMPACT DISC APPENDIX

Not Applicable

BACKGROUND OF THE INVENTION

The current design for a large (100-300 foot) wind turbine is modeled after an old time windmill. While this application certainly works it leaves a lot to be desired. In a large wind farm facility with many acres to utilize (i.e. the country) the windmill design works well. However, it has many drawbacks. The large rotating blades can kill birds and even more importantly; it does not work at all without wind. Solar panels work fine as long as the sun is shining. However, in the dark they are useless. There is a need for improved systems and methods for generation of electricity from sustainable energy. The purpose of this invention is to solve these problems.

A search of other concepts to solve this problem includes Ogin Energy http://oginenergy.com that adds a shroud to the wind turbine in order to increase the power of the turning blades. Also, the following inventions have received patents in the field, U.S. Pat. No. 8,938,967 by Thomas McMaster uses a hybrid solar/fuel cell system and U.S. Pat. No. 6,127,739 by inventor Kari Appa uses a jet assisted counter rotating wind turbine. However, they both require the use of a tower and blades similar to a windmill.

BRIEF SUMMARY OF THE INVENTION

This unique invention is a solar panel based electrical power generating system that utilizes man-made wind from high performance compressor fans to compress air that spins a vertical or horizontal axis wind turbine that utilizes a gearing system to rotate a generator that creates electricity for grid scale applications. The embodiment is designed to convert solar energy via solar panels into electricity in order to power high performance compressor fans that create compressed air that blow air through a nacelle that spins a vertical or horizontal axis wind turbine located at the top (vertical) or end (horizontal) of the structure that utilizes a gear box connected to the wind turbine via a shaft that turns a generator that creates electricity for grid scale applications. The system also incorporates a unique self generating energy feature that utilizes part of its generated electricity to recharge its batteries and/or power its compressor fans. If the entire system is without power, the sun could charge the batteries and/or operate the compressor fans which would start the process of electricity production.

In both the vertical and horizontal embodiments the blades, hub and tower are removed from a standard 100-300 ft. wind turbine. A custom hub would be built that would be similar in style to a spiral roof top turbine. The device is designed to supplement and/or replace 100-300 foot wind turbines and solar panel farms that are currently in existence. The system is designed to repurpose an existing wind turbine's nacelle and internal components without the need for a hub, the long blades attached to the hub or a tower. It is also designed to either totally or partially replace nuclear power plants, coal fired power plants and natural gas power plants. It is a sustainable, clean and safe method to create electricity. It utilizes a battery system to store the electricity. It has a self generating power structure that enables a portion of the generated electricity to either charge the batteries, operate the compressor fans and/or be sent to the grid.

One of the embodiments of the invention in a vertical position can be in the form of a typical water tower structure so that it is unobtrusive in an urban environment. It can utilize its original nacelle or have a custom enclosure built. It can also be placed horizontally in its original nacelle (or a manufactured container capsule) so that its vertical height is reduced. With these embodiments the device is able to be placed within urban areas so that it does not require the construction of new long distance high voltage lines that current wind turbine and solar farms in the country require in order for the electricity to be transmitted to the urban areas where it is needed. These embodiments allow it to utilize existing high voltage transmission systems that already exist in urban environments.

The nacelle (container of the components) of the device can either use a standard nacelle for the wind turbines components or a custom nacelle could be built that allows for the compression of the air. Also a standard wind turbine nacelle could have a structure built around it that would allow it to be placed almost anywhere.

At the bottom or sides of the vertical embodiment are air intakes that allow the air to be drawn into the structure by multiple compressor fans. The fans are located within the apertures thereby only allowing air into the nacelle. At the spiral turbine end of the structure the air is exhausted; this allows the air to circulate through the structure. To be specific: the compressor fans force compressed air through the container capsule into the turbine. The modified hub of the turbine has a spiral design that turns due to the air pressure. This spins the turbine. The turbine is connected to a gearing system. The gearing system is connected to a generator. The generator is connected to a transformer. The drag placed on the turbine by the gearing system and/or the generator slow down the even flow of the air exiting the spiral turbine thereby compressing it.

The exhaust air from the turbine is sent into a holding tank that surrounds the turbine and then the air is exhausted through the vents into the atmosphere. Also, the air can be exhausted through the turbine and directly into the atmosphere if no holding tank is desired or necessary. The air generated by the compressor fans is compressed due to the resistance caused by the interaction of the turbine, the gearbox and the generator. The turbine is attached to the nacelle thereby forcing the air from the nacelle through the aperture below the center of the turbine which turns the turbine due to its spiral shape and air opening. The release of the air through the turbine turns the generator that creates the electricity and also reduces the air pressure within the nacelle.

The majority of the electricity created by the generator (alternating current) is sent to a transformer in order to have the voltage lowered if necessary for use in the form of 220 volts (home/business) or it is stepped up to a higher voltage if it needs to be transmitted over long distances via high voltage wires. Part of the electricity created by the generator is also sent to a transformer in order to have the voltage modified and inverted from alternating current into direct current in order to charge the batteries if necessary and/or to operate the compressor fans. The entire process is monitored by a Master Control Unit.

DETAILED DESCRIPTION OF THE INVENTION

Figure 1:
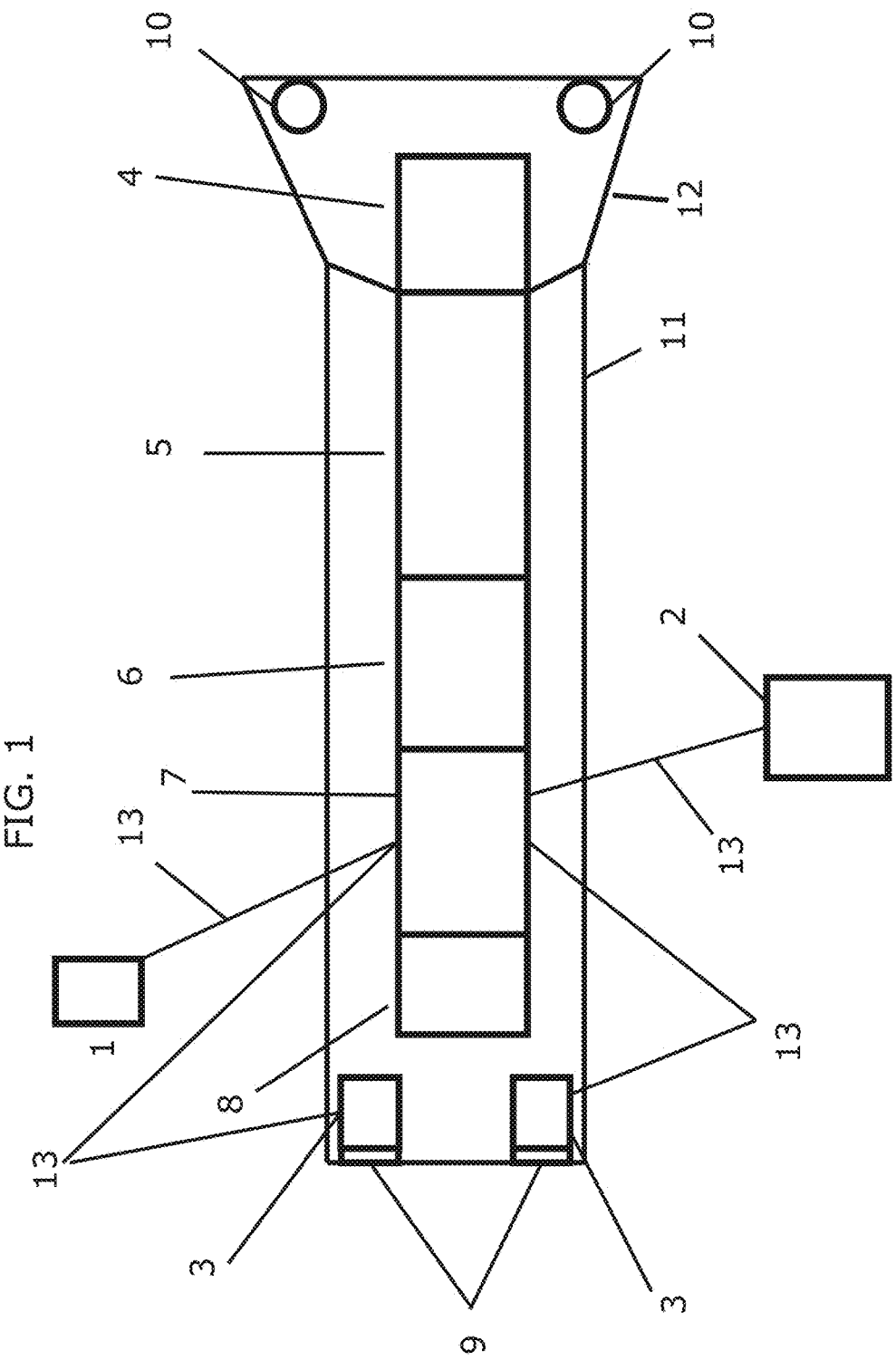
FIG. 1 is a drawing of a horizontal embodiment of the invention with an air holding tank.
Figure 2:
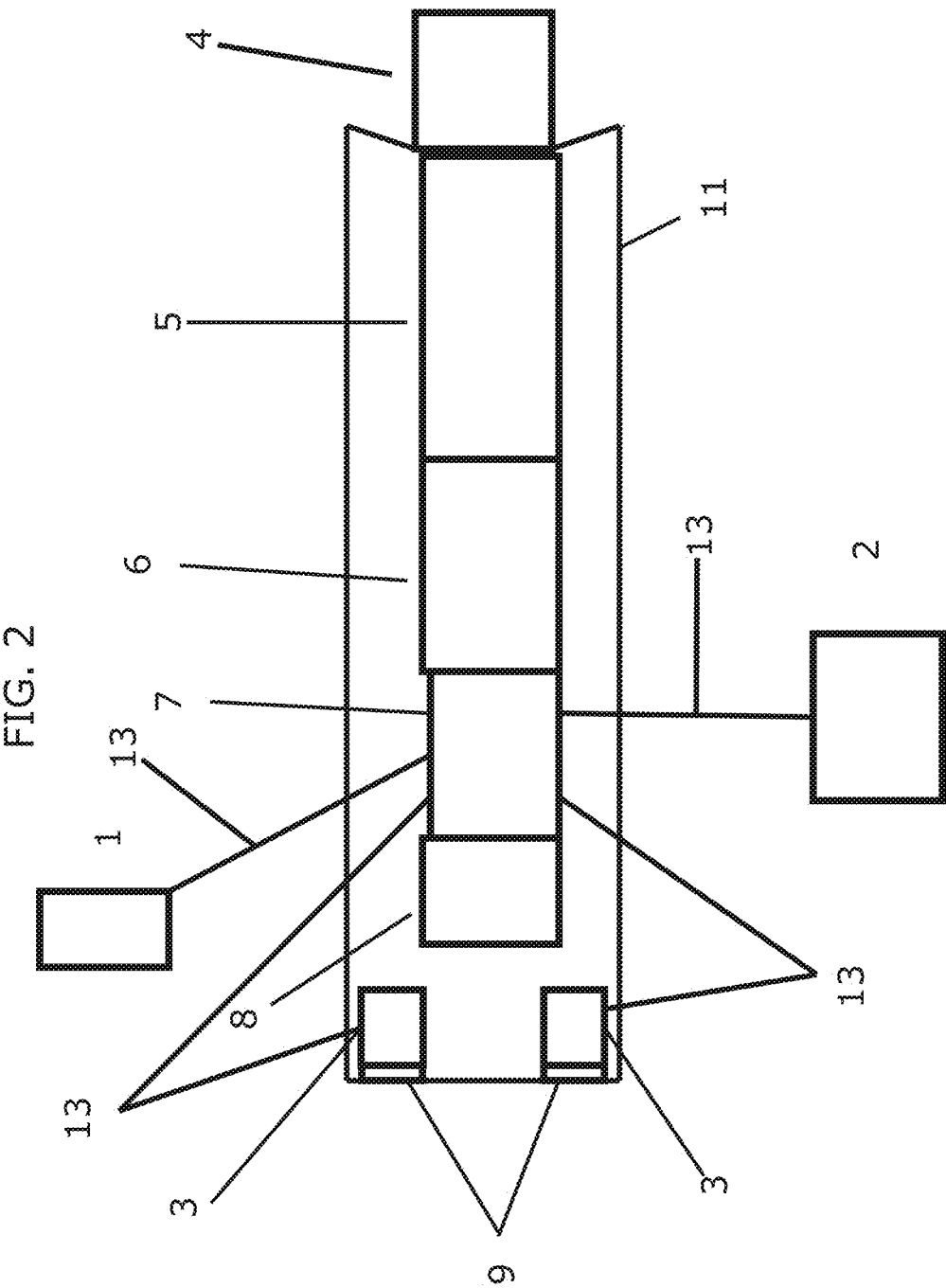
FIG. 2 is a drawing of a horizontal embodiment without a holding tank.
Figure 3:
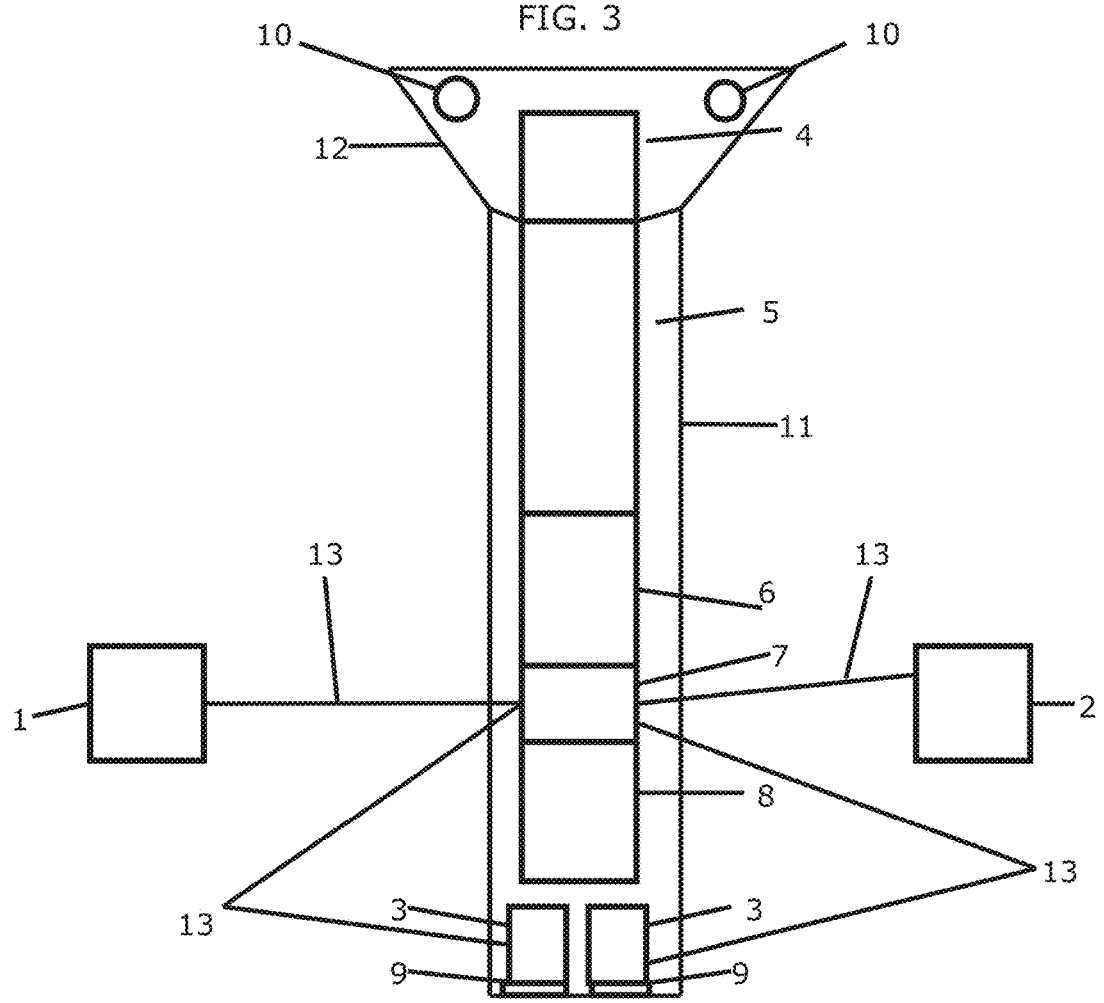
FIG. 3 is a drawing of a vertical embodiment of the invention with an air holding tank.
Figure 4:
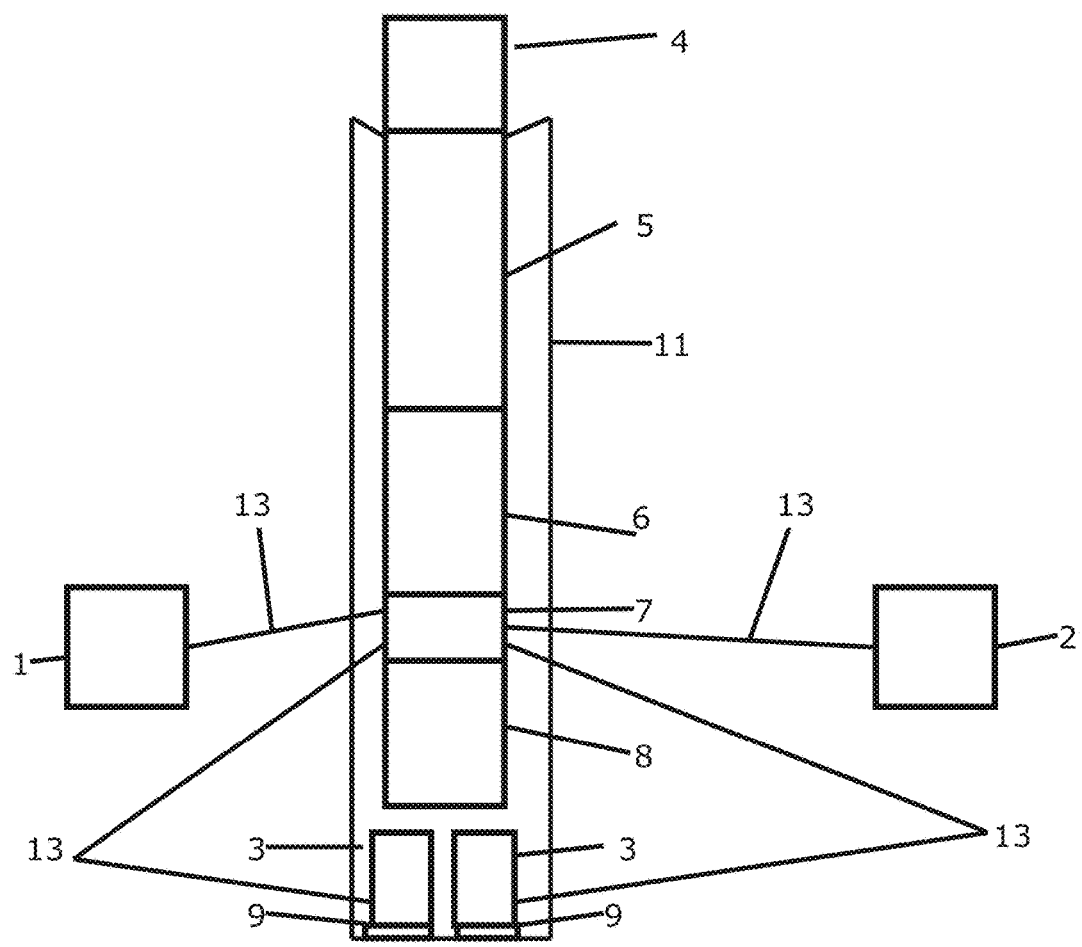
FIG. 4 is a drawing of a vertical embodiment of the invention without an air holding tank.
Figure 5:
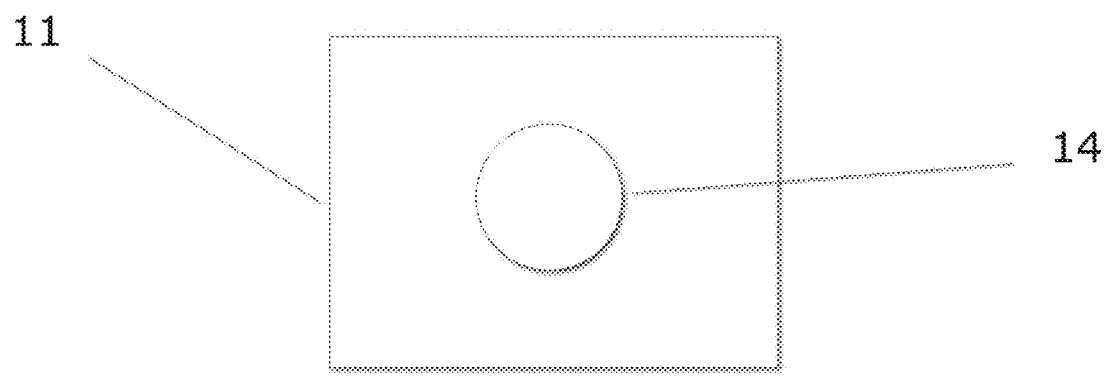
FIG. 5 is a drawing of the view below the turbine.
Figure 6:
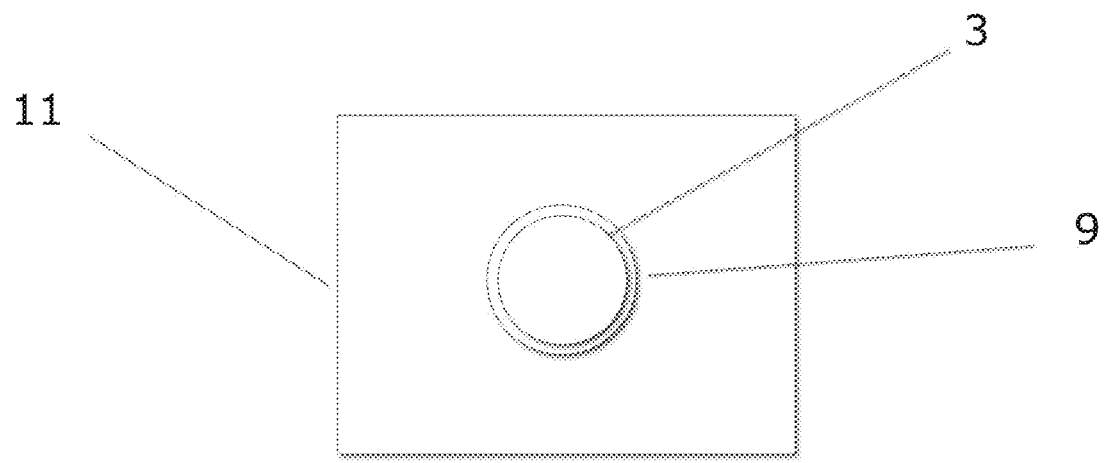
FIG. 6 clarifies the relationship between the Fan and the Air Intake Aperture.

The sun's rays hit the solar panels (1) that can charge the batteries (2) and/or are used to power the compressor fans (3) that force the outside air into the nacelle towards the exhaust outlets (10). The solar panels, batteries, and MCU are connected with electric cables (13). The exhaust outlets are located in an air holding tank (12). The intake air comes from outside the nacelle at the bottom or sides of the structure (9). The man-made compressed air (via fans) forces the air inside the containment vessel/nacelle (11) this action ultimately turns the spiral turbine (4) at the end of the structure.

The spiral turbine is connected to the nacelle. There is an aperture below the turbine (14). The compressed air enters the aperture and then turns the turbine in order to escape/equalize the pressure. The nacelle (11) serves as a wind tunnel. Also, an existing nacelle of a wind turbine could also be used as the containment structure. The blades, the hub and the tower of a standard 100-300 ft. wind turbine would be removed and a modified turbine hub would be added. The turbine (4) turns a gearbox (5) that drives a generator (6) that creates and sends the electricity to a transformer (8) the electricity is sent through a transmission network (the grid) that sends the power to buildings. The potential exists for the gearbox (5) to be an optional unit.

A computerized Master Control Unit (MCU) (7) governs where the electricity will be sent. The activation and speed of the fans, the output, governing and interaction of all of the devices, the charging of the batteries, interconnectivity with other similar devices, the monitoring of the entire system, self diagnosis of the system, alerts to interested parties while it also continually monitors the entire system internally. It has the potential to be connected to other similar devices and send information via the internet back to headquarters.

The majority of the electricity produced is sent to the grid. A portion of the electricity can be transformed into a lower voltage and inverted from alternating current to direct current so that it can be used to both charge the batteries and/or power the fans. The compressor fans can be alternating current and/or direct current.

LIST OF REFERENCE NUMERALS

1. Solar Panels
2. Batteries
3. Compressor Fans
4. Turbine
5. Gearbox
6. Generator
7. Master Control Unit (MCU)
8. Transformer
9. Air Intake Aperture
10. Exhaust Outlet
11. Nacelle
12. Air Holding Tank
13. Electric Cable
14. Aperture below the turbine

The invention claimed is:
1. A system for generating electrical energy, said system comprising:
a nacelle for housing electronic components;
a plurality of batteries;
a plurality of compressor fans;
a plurality of solar panels for providing power to the compressor fans and/or the batteries;
a turbine;
a generator coupled to the turbine for generating electricity;
a master control unit operable to determine whether to send generated electricity to a power grid, the batteries, the compressor fans, or for internal use;
a transformer capable of increasing or decreasing a voltage of the generator;
a plurality of air intakes that allow air to enter the nacelle from the atmosphere;
a holding tank that captures air exhausted by the turbine, wherein the holding tank has a plurality of outlets to vent exhausted air into the atmosphere;
wherein the holding tank is functional to protect birds from the turbine;
wherein the plurality of said compressor fans force air into the nacelle, creating a compressed air, and said compressed air drives said turbine; and
wherein an existing wind turbine's nacelle and internal components are repurposed without a blade hub, long blades attached to the blade hub, and a tower.
2. The system according to claim 1, wherein the turbine is spiral shaped.
3. The system according to claim 1, further comprising a gearbox connected between the turbine and the generator.
4. The system according to claim 1, wherein said system can be oriented vertically or horizontally.
5. The system according to claim 1, wherein the plurality of said solar panels provides power to said compressor fans, thereby eliminating the need for an external wind.
6. The system according to claim 1, wherein the plurality of compressor fans are placed within or adjacent to said air intakes.
7. The system according to claim 1, wherein said system is placed in urban areas allowing the usage of existing power lines.
8. The system according to claim 7, wherein said system is used to supplement wind or solar farms.

* * * * *